United States Patent
Engel

(10) Patent No.: US 7,397,823 B2
(45) Date of Patent: Jul. 8, 2008

(54) PROVIDING TIME SYNCHRONIZATION ACROSS STORE-AND-FORWARD COMMUNICATION DEVICES USING PROTOCOL-ENABLED SWITCHES

(75) Inventor: Glenn R. Engel, Snohomish, WA (US)

(73) Assignee: Agilent Technologies, Inc., Santa Clara, CA (US)

( * ) Notice: Subject to any disclaimer, the term of this patent is extended or adjusted under 35 U.S.C. 154(b) by 937 days.

(21) Appl. No.: 10/454,290

(22) Filed: Jun. 4, 2003

(65) Prior Publication Data

US 2004/0246996 A1 Dec. 9, 2004

(51) Int. Cl.
*H04J 3/06* (2006.01)
(52) U.S. Cl. ...................................... 370/503
(58) Field of Classification Search .............. 370/508, 370/503; 709/248
See application file for complete search history.

(56) References Cited

U.S. PATENT DOCUMENTS 5,566,180 A * 10/1996 Eidson et al. ............... 370/473
6,665,316 B1 * 12/2003 Eidson ....................... 370/509
6,975,653 B2 * 12/2005 Eidson ....................... 370/503
2003/0048811 A1 * 3/2003 Robie et al. ................. 370/509
2004/0062278 A1 * 4/2004 Hadzic et al. ............... 370/503
2004/0246996 A1 * 12/2004 Engel ......................... 370/508

FOREIGN PATENT DOCUMENTS

EP 1 274 213 1/2003

OTHER PUBLICATIONS

IEEE 1588, "Standard for a Precision Clock Synchronization Protocol for Networked Measurement and Control Systems", Nov. 8, 2002, pp. iv, 116, 119, 140.*
European Search Report dated Mar. 22, 2006.

* cited by examiner

Primary Examiner—Seema S. Rao
Assistant Examiner—Jianye Wu

(57) ABSTRACT

Techniques for using protocol-enabled switches to provide time synchronization across store-and forward communication devices. A protocol-enabled switch according to the present techniques bypasses a store-and forward communication device for the purposes of time synchronization by merging timing packets into each subnet serviced by the store-and forward communication device, thereby avoiding the variable delays that may occur in the store-and forward communication device.

20 Claims, 4 Drawing Sheets

//PROVIDING TIME SYNCHRONIZATION ACROSS STORE-AND-FORWARD COMMUNICATION DEVICES USING PROTOCOL-ENABLED SWITCHES

BACKGROUND

A wide variety of systems including industrial systems, e-commerce systems, information systems, etc., employ packet-based communication networks. Examples of packet-based communication networks include networks that conform to Ethernet standards. The entities that communicate via a packet-based communication network may be referred to as nodes. Examples of nodes include computers, workstations, control devices, sensor devices, computational devices, information servers, etc.

The nodes in a packet-based communication network may be arranged as a set of subnets. Each subnet may provide communication among a corresponding subset of the nodes. Store-and-forward communication devices may be used to forward packets between the subnets. One example of a store-and-forward communication device is a router.

The nodes that communicate via a packet-based communication network may include local clocks. In addition, the nodes may synchronize the time values contained in their local clocks by exchanging timing packets via the packet-based communication network. For example, the nodes may implement the Precision Time Protocol (PTP) as set forth in the IEEE 1588 standard for synchronizing their local clocks by exchanging timing packets and determining the delay in timing packet transfer between nodes.

The amount of time taken by a store-and-forward communication device to forward timing packets between subnets may vary depending on the amount of other traffic underway. A variation in the time taken to forward timing packets between subnets usually causes variation in the delay of timing packet transfer between nodes. Unfortunately, a variable delay in timing packet transfer between nodes may hinder the accuracy of a time synchronization protocol such as PTP that relies on a determination of the delay in timing packet transfer.

SUMMARY OF THE INVENTION

Techniques are disclosed for using protocol-enabled switches to provide time synchronization across store- and forward communication devices. A protocol-enabled switch according to the present techniques bypasses a store- and forward communication device for the purposes of time synchronization by merging timing packets into each subnet serviced by the store- and forward communication device, thereby avoiding the variable delays that may occur in the store- and forward communication device.

A communication network according to the present techniques includes a store-and-forward communication device and a protocol-enabled switch. The store-and-forward communication device includes a set of ports each for communicating via a corresponding subnet of nodes wherein one or more of the nodes synchronize a local time using a protocol that includes determining delays in the transfer of timing packets. The protocol-enabled switch provides the timing packets to each subnet according to the protocol, thereby bypassing the store-and-forward communication device and the store-and-forward communication device does not forward the timing packets on the subnets.

Other features and advantages of the present invention will be apparent from the detailed description that follows.

BRIEF DESCRIPTION OF THE DRAWINGS

The present invention is described with respect to particular exemplary embodiments thereof and reference is accordingly made to the drawings in which.

DETAILED DESCRIPTION

Figure 1:
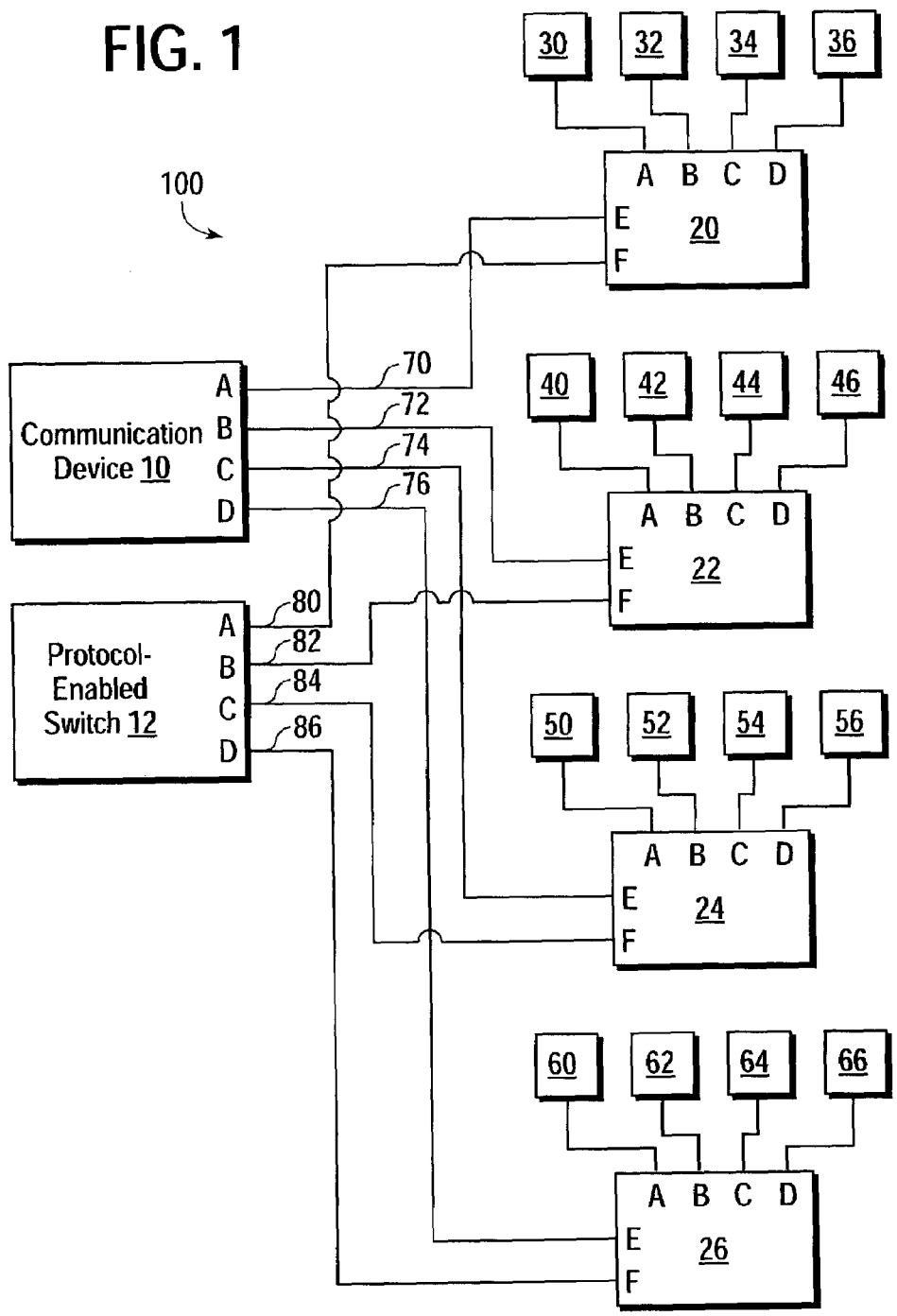
FIG. 1 shows one embodiment of a communication network according to the present teachings.

FIG. 1 shows one embodiment of a communication network 100 according to the present teachings. The communication network 100 includes a store-and-forward communication device 10 that enables communication among a set of subnets of nodes 30-36, 40-46, 50-56, and 60-66. Any one or more of the nodes 30-36, 40-46, 50-56, and 60-66 may include a corresponding local clock and may participate in a protocol for synchronizing their local clock by exchanging timing packets via the communication network 100. In one embodiment, the store-and-forward communication device 10 is a router.

The store-and-forward communication device 10 communicates with the nodes 30-36 via a communication link 70 and a network distribution device 20. Similarly, the store-and-forward communication device 10 communicates with the nodes 40-46, 50-56, and 60-66 via a set of communication links 72-76 and a set of network distribution devices 22-26. The store-and-forward communication device 10 includes a set of subnet ports A-D for connecting to the communication links 70-76. Each network distribution device 20-26 includes a corresponding set of relay ports A-F. The relay ports A-E in this embodiment are used for connecting to the corresponding nodes 30-36, 40-46, 50-56, and 60-66 and the corresponding communication links 70-76.

The communication network 100 includes a protocol-enabled switch 12 that handles the exchange of timing packets with nodes 30-36, 40-46, 50-56, and 60-66. The protocol-enabled switch 12 communicates with the nodes 30-36, 40-46, 50-56, and 60-66 via a set of communication links 80-86. In this embodiment, the communication links 80-86 connect between a set of switch ports A-D of the protocol-enabled switch 12 and the relay ports F of the network distribution devices 20-26. The protocol-enabled switch 12 does not forward any packets carried on the communication links 80-86.

In other embodiments, the store-and-forward communication device 10 may have any number of subnet ports and the protocol-enabled switch 12 provides a corresponding switch port for each subnet port. Similarly, the network distribution devices that connect to nodes may have any number of relay ports depending on the number of corresponding nodes.

The store-and-forward communication device 10 is configured so that it does not forward any timing packets carried on the communication links 70-76. In one embodiment, the store-and-forward communication device 10 ignores timing packets that are multicast packets with a time_to_live=1 according to the IEEE 1588 protocol. The ignoring of the timing packets by the store-and-forward communication device 10 avoids the variable delays in timing packet transfer in the communication network 100 that might otherwise occur if the store-and-forward communication device 10 were to be used to forward timing packets across subnets. Instead, the protocol-enabled switch 12 provides time synchronization functionality to the nodes 30-36, 40-46, 50-56, and 60-66 by exchanging timing packets nodes 30-36, 40-46, 50-56, and 60-66 via the communication links 80-86.

In one embodiment, the protocol-enabled switch 12 acts as a master clock that generates and transmits timing packets on each of the communication links 80-86 according to the PTP protocol set forth in the IEEE 1588 standard. The network distribution devices 20-26 relay timing packets received via their relay ports F onto their relay ports A-D. In addition, the network distribution devices 20-26 relay timing packets received via their relay ports A-D onto their relay ports F.

Figure 2:
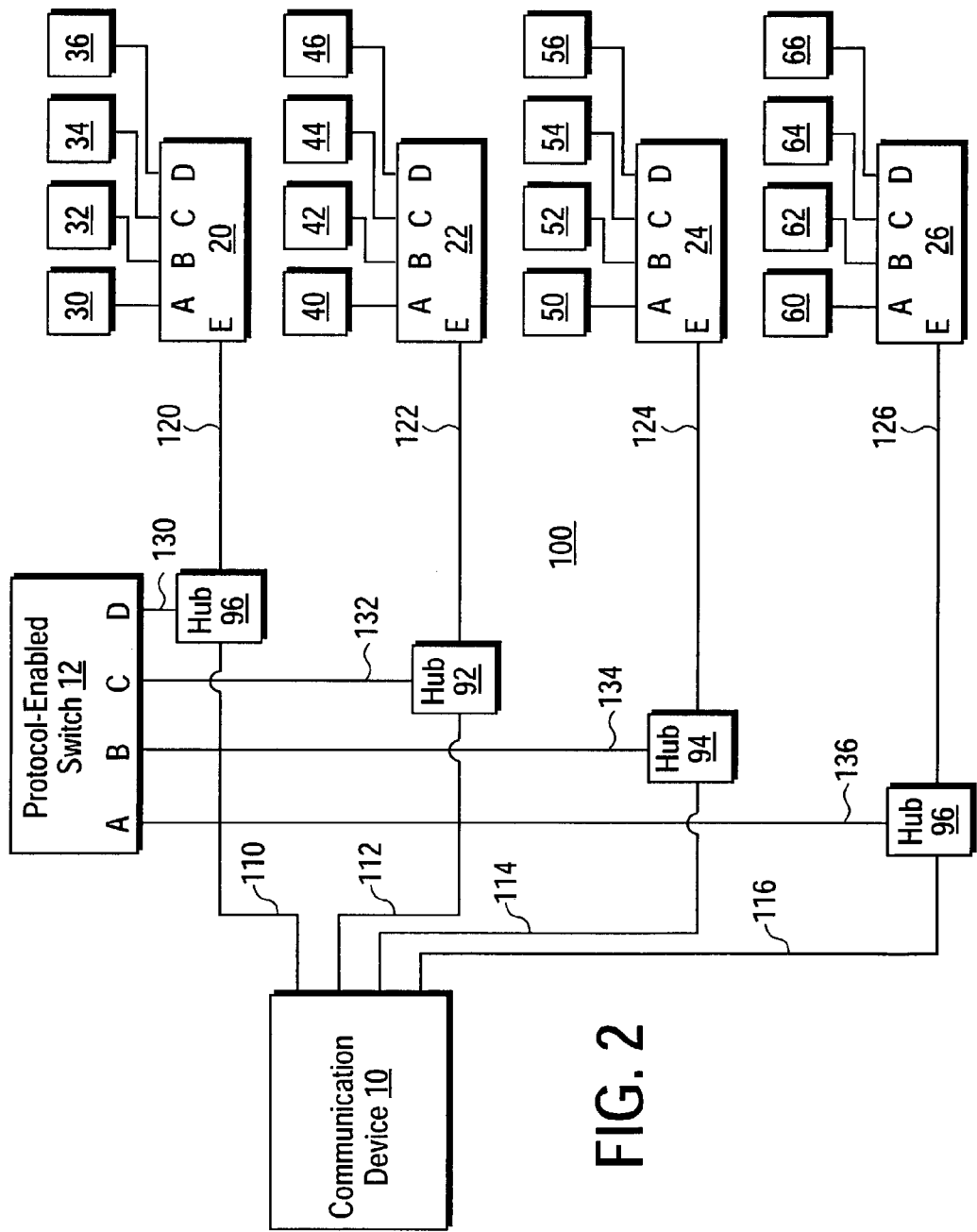
FIG. 2 shows another embodiment of a communication network according to the present teachings.

FIG. 2 shows another embodiment of the communication network 100 according to the present teachings. In this embodiment, the protocol-enabled switch 12 exchanges timing packets with the nodes 30-36, 40-46, 50-56, and 60-66 via a set of communication links 120-126, a set of hubs 90-96, and a set of communication links 130-136. The communication links 120-126 connect in this embodiment to the relay ports E of the network distribution devices 20-26. The store-and-forward communication device 10 does not forward timing packets carried on the communication links 110-116 and the protocol-enabled switch 12 does not relay packets carried via the communication links 130-136.

Figure 3:
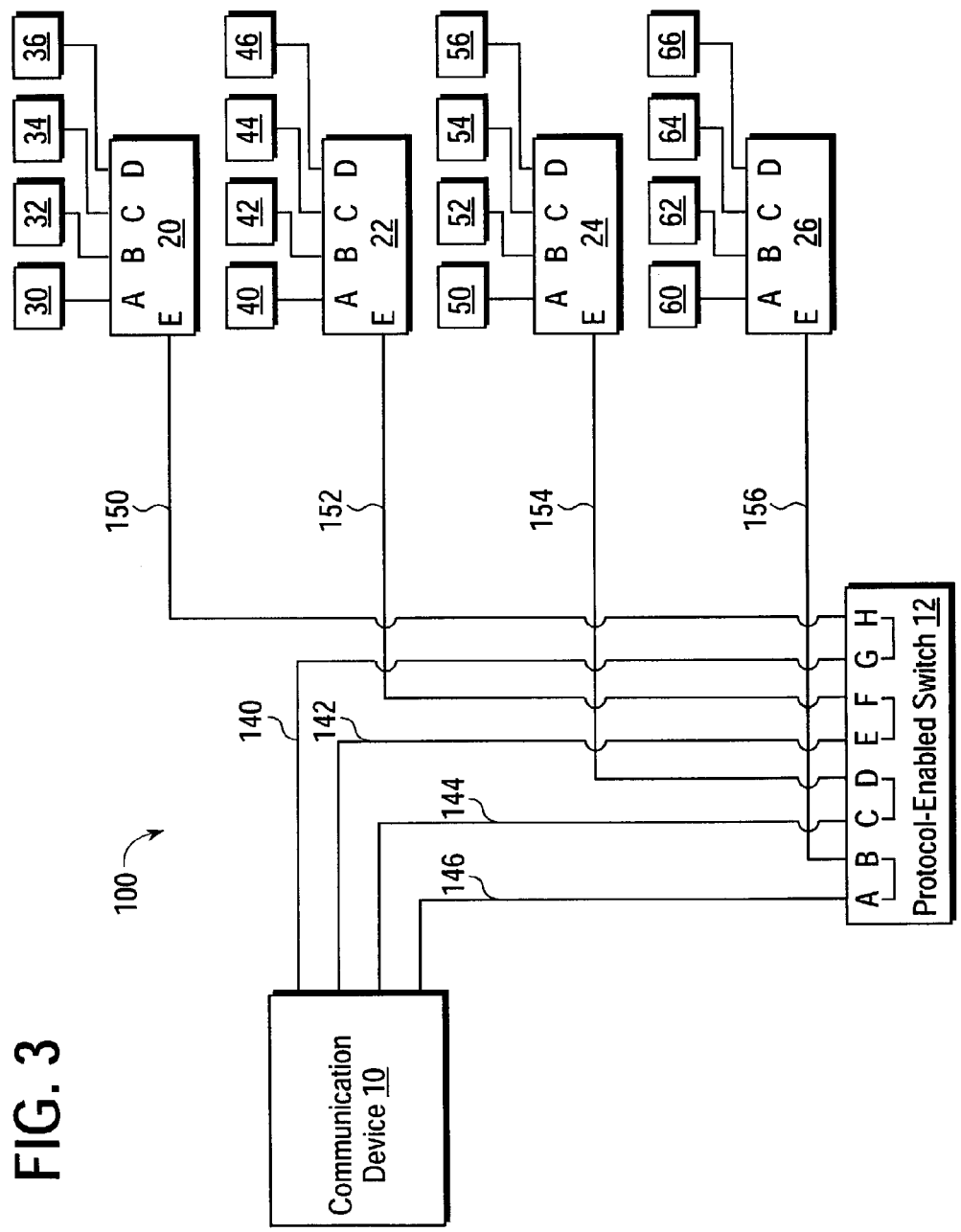
FIG. 3 shows yet another embodiment of a communication network according to the present teachings.

FIG. 3 shows yet another embodiment of the communication network 100 according to the present teachings. In this embodiment, the protocol-enabled switch 12 includes a set switch ports A-H that are segmented into groups of two. The switch ports A-B are grouped together so that the protocol-enabled switch 12 relays packets between the communication links 146 and 156. Similarly, the switch ports C-D are grouped together so that the protocol-enabled switch 12 relays packets between the communication links 144 and 154, the switch ports E-F are grouped together so that the protocol-enabled switch 12 relays packets between the communication links 142 and 152, and the switch ports G-H are grouped together so that the protocol-enabled switch 12 relays packets between the communication links 140 and 150. The protocol-enabled switch 12 does not relay packets between different groups.

The store-and-forward communication device 10 does not forward timing packets carried on the communication links 140-146. The protocol-enabled switch 12 exchanges timing packets with the nodes 30-36, 40-46, 50-56, and 60-66 via the communication links 150-156 and the relay ports E of the network distribution devices 20-26.

A variety of network distribution devices may be used to relay packets in a subnet of nodes. For example, any of the network distribution devices 20-26 may be a switch or a hub or a combination. In addition, any of the network distribution devices 20-26 may be a protocol-enabled switch that synchronizes its local master clock to the master clock 212 contained in the protocol-enabled switch 12. A master clock in a protocol-enabled switch of the network distribution devices 20-26 is then used to drive synchronization of local clocks in downstream subnets.

Figure 4:
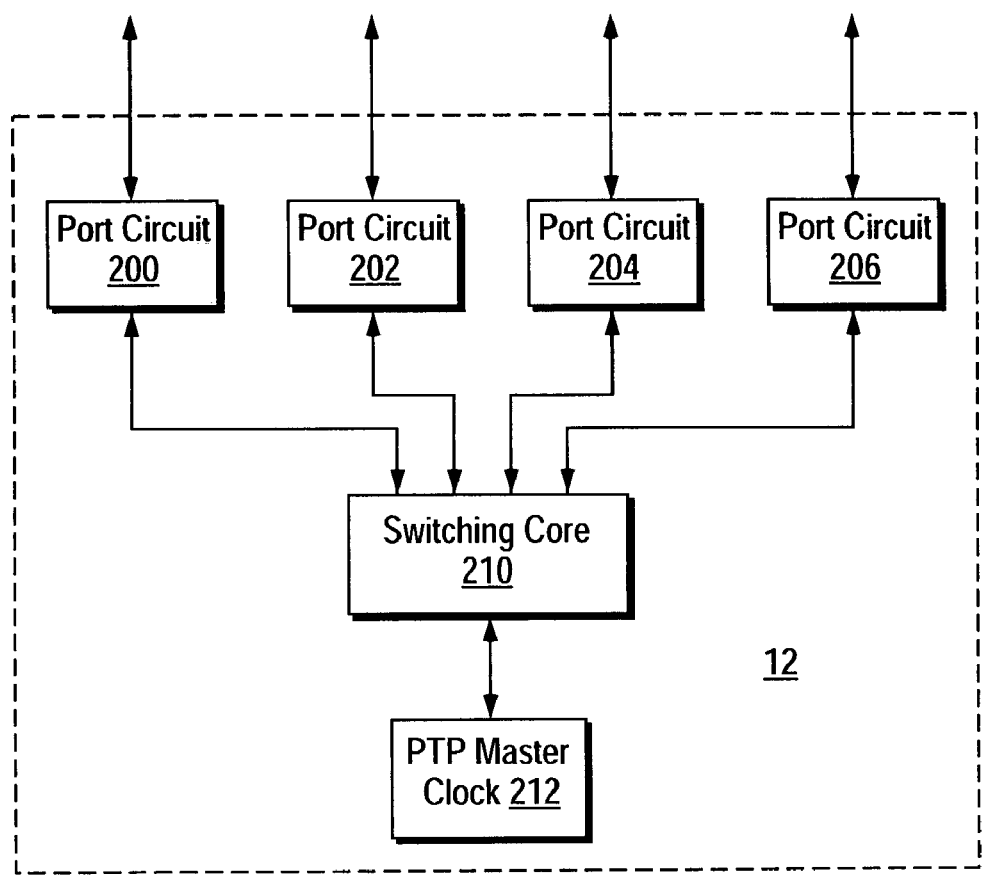
FIG. 4 shows one embodiment of a protocol-enabled switch.

FIG. 4 shows one embodiment of the protocol-enabled switch 12. The protocol-enabled switch 12 includes a set of port circuits 200-206, a switching core 210, and a PTP master clock 212.

Each port circuit 200-206 enables communication via a corresponding Ethernet communication link. Incoming packets are provided by the port circuits 200-206 to the switching core 210. The normal switching function of the switching core 210 is disabled so that packets are not forwarded among the port circuits 200-206.

The PTP master clock 212 functions as a master clock according to the PTP protocol set forth in the IEEE 1588 standard. The PTP master clock 212 generates timing packets and provides the timing packets to the switching core 210. The switching core 210 provides the timing packets to the port circuits 200-206 for transmission. Timing packets received by the port circuits 200-206 are provided to the switching core 210 and the switching core provides the received timing packets to the PTP master clock 212.

The protocol-enabled switch 12 may be a PTP enabled switch that is modified to disable relaying of packets between its ports or between groups of ports. For example, such a modification may be accomplished by altering the firmware of the switching core 210.

The foregoing detailed description of the present invention is provided for the purposes of illustration and is not intended to be exhaustive or to limit the invention to the precise embodiment disclosed. Accordingly, the scope of the present invention is defined by the appended claims.

What is claimed is:

1. A communication network, comprising:
a plurality of subnets, wherein each subnet includes a plurality of nodes;
a store-and-forward communication device having a set of subnet ports, wherein each port communicates with a corresponding subnet of the plurality of subnets, wherein one or more of the nodes synchronize a local time using a protocol that includes a set of timing packets that are ignored by the store-and-forward communication device;
a protocol-enabled switch that provides the timing packets for each subnet according to the protocol; and
a plurality of distribution devices, wherein each distribution device is associated with a corresponding subnet, and each distribution device includes a first relay port that is connected to the store-and-forward communication device and a second relay port that is connected to the protocol-enabled switch.

2. The communication network of claim 1, wherein the store-and-forward communication device is a router.

3. The communication network of claim 1, wherein each node is selected from the group consisting of:
a computer, a workstation, a control device, a sensor device, a computational device, and an informational server.

4. The communication network of claim 1, wherein the protocol is the Precision Time Protocol as set forth in IEEE 1588.

5. The communication network of claim 1, wherein the set of timing packets are multicast packets with a time_to_live=1.

6. The communication network of claim 1, wherein the protocol-enabled switch operates as a master clock for the communication network.

7. The communication network of claim 1, wherein each network distribution device is selected from the group consisting of:
a switch, a hub, and another protocol enabled switch.

8. The communication network of claim 1, wherein the protocol-enabled switch is configured to not relay any packets among the subnets.

9. The communication network of claim 1, wherein each distribution device includes a plurality of node relay ports, wherein each node relay port is connected to a corresponding node.

10. A communication network, comprising:
a plurality of subnets, wherein each subnet includes a plurality of nodes;
a store-and-forward communication device having a set of subnet ports, wherein each port communicates with a corresponding subnet of the plurality of subnets, wherein one or more of the nodes synchronize a local time using a protocol that includes a set of timing packets that are ignored by the store-and-forward communication device;
a protocol-enabled switch that provides the timing packets for each subnet according to the protocol;
a plurality of hubs, with each hub being connected to the store-and-forward communication device, the protocol-enabled switch, and a respective one of the plurality of subnets; and
a plurality of distribution devices, wherein each distribution device is associated with a corresponding subnet, and each distribution device includes relay port that is connected to the associated hub.

11. The communication network of claim 10, wherein the a store-and-forward communication device is a router.

12. A communication network, comprising:
a plurality of subnets, wherein each subnet includes a plurality of nodes;
a store-and-forward communication device having a set of subnet ports, wherein each port is associated with a corresponding subnet of the plurality of subnets, wherein one or more of the nodes synchronize a local time using a protocol that includes a set of timing packets that are ignored by the store-and-forward communication device;
a protocol-enabled switch that provides the timing packets for each subnet according to the protocol; and
a plurality of distribution devices, wherein each distribution device is associated with a corresponding subnet, and each distribution device includes relay port that is connected to protocol-enabled switch;
wherein the protocol-enabled switch comprises a first plurality of ports, each of which are connected with a respective one of the subnet ports, and a second plurality of ports, each of which are connected with a respective distribution device.

13. The communication network of claim 12, wherein the a store-and-forward communication device is a router.

14. The communication network of claim 12, wherein each node is selected from the group consisting of:
a computer, a workstation, a control device, a sensor device, a computational device, and an informational server.

15. The communication network of claim 12, wherein the protocol is the Precision Time Protocol as set forth in IEEE 1588.

16. The communication network of claim 12, wherein the protocol-enabled switch operates as a master clock for the communication network.

17. The communication network of claim 12, wherein each network distribution device is selected from the group consisting of:
a switch, a hub, and another protocol enabled switch.

18. The communication network of claim 12, wherein the protocol-enabled switch is configured to not relay any packets among the subnets.

19. The communication network of claim 12, wherein each distribution device includes a plurality of node relay ports, wherein each node relay port is connected to a corresponding node.

20. The communication network of claim 12, wherein first and second plurality of ports of the protocol-enabled switch are arranged switch port pairs, where each pair is formed from a port of the first plurality and a port of the second plurality and connects the corresponding subnet port and the network distribution device for the corresponding subnet.

* * * * *